Figure 4:
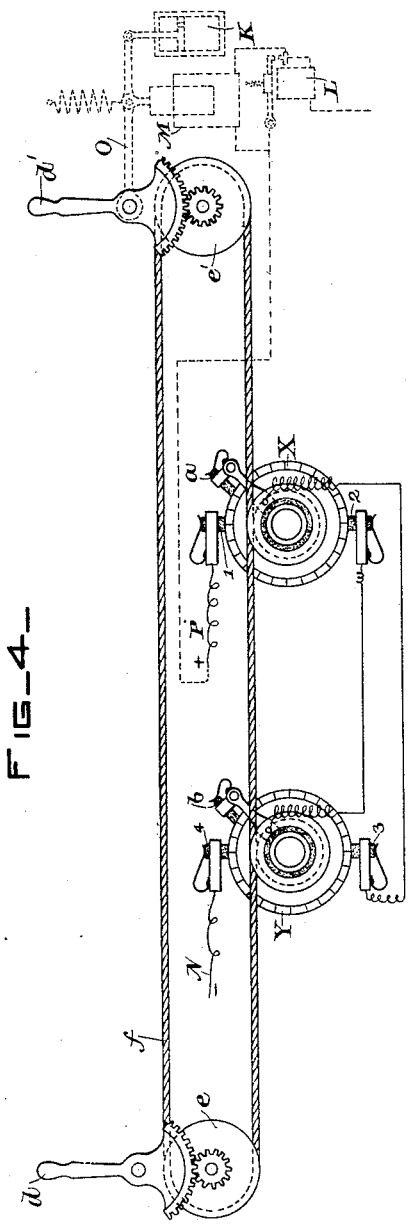

(No Model.) 2 Sheets—Sheet 1.
E. M. BENTLEY.
ELECTO MOTIVE FORCE REGULATOR.
No. 456,612. Patented July 28, 1891.
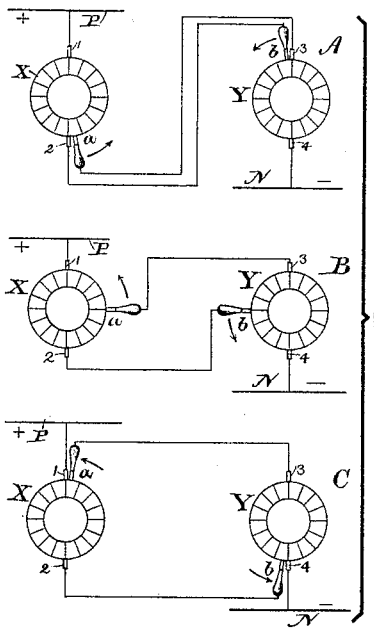
FIG. 1.
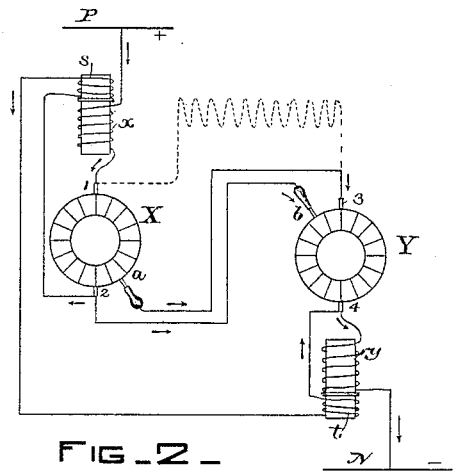
FIG. 2.
FIG. 3.
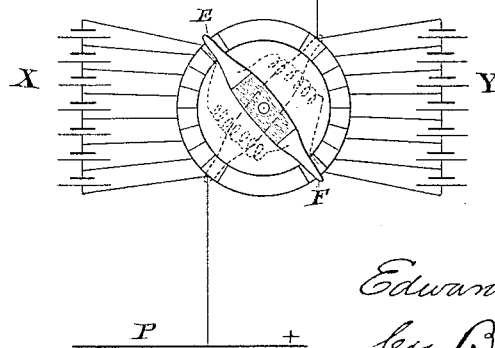
WITNESSES:
INVENTOR:
Edward M. Bentley
by Bentley & Knight
ATTYS.

(No Model.) 2 Sheets—Sheet 2.

E. M. BENTLEY.
ELECTO MOTIVE FORCE REGULATOR.

No. 456,612. Patented July 28, 1891.

WITNESSES:
A. L. Orne
E. L. Rawson

INVENTOR:
Edward M Bentley
by Bentley & Wright
ATTYS.

UNITED STATES PATENT OFFICE.

EDWARD M. BENTLEY, OF BOSTON, MASSACHUSETTS.

ELECTRO-MOTIVE-FORCE REGULATOR.

SPECIFICATION forming part of Letters Patent No. 456,612, dated July 28, 1891.

Application filed October 21, 1890. Serial No. 368,779. (No model.)

*To all whom it may concern:*

Be it known that I, EDWARD M. BENTLEY, a citizen of the United States, residing at Boston, in the county of Suffolk, State of Massachusetts, have invented certain new and useful Improvements in Electro-Motive-Force Regulators Adapted for Electric Generators and Motors, of which the following is a specification:

My invention is illustrated in the accompanying drawings, in which—

Figure 1 represents the invention applied to a dynamo-electric machine or motor. Fig. 2 shows means for regulating the motor by means of my device and at the same time varying the field-magnet strength, and Fig. 3 shows the invention applied to a generator consisting of a series of battery-cells. Fig. 4 shows a device for moving the supplementary commutator-contacts either manually or automatically.

My invention is especially adapted to dynamo-electric machines and motors. With the former it will be used to regulate the output of the machine and with the latter it will be used to regulate the counter electro-motive force, thereby controlling the speed of rotation.

The invention consists in providing two sources of electro-motive force or dividing into two parts an original source, which are divided into sections in series with one another. One terminal of each of the two series is permanently connected to one of the two line-wires, respectively. The other terminals of the series are each connected to a moving contact which passes over a series of contact-plates connected to the successive sections of the opposite source of electro-motive force, and by this means the two sources may be gradually changed from series to multiple arc connection.

Referring to Fig. 1, X and Y represent the commutators of two dynamo-electric machines or motors. Each of these machines is considered either as a source of electro-motive force or as a part of the whole apparatus considered as a generator of electro-motive force, and it will be well understood by those skilled in the art that I may use either two independent machines or a machine having two armatures or a machine in which there are two independent windings upon the same armature. The sections into which each source of electro-motive force is divided are represented by the separate coils of the armature. Normally the sections are in series between the two brushes of the machine, and a movable brush may be applied at any point in the periphery of the commutator, and any desired number of sections thereby included in circuit. One terminal of each of these machines is permanently connected to one of the two line-wires, respectively. Thus the brushes 1 and 4 are connected, respectively, to the main lines P and N. The remaining terminal of each of the two machines is connected to a movable contact adapted to pass over the commutator of the opposite machine. Thus the brush 2 is connected to a movable contact $b$, adapted to move over the commutator of the opposite machine from the brush 3 to the brush 4. In the same way the brush 3 is connected to a movable contact $a$, adapted to pass over the commutator of the opposite machine from the brush 2 to the brush 1.

The three diagrams of Fig. 1, A, B, and C, show, respectively, the two extremes and the middle positions of the contacts. In A it will be seen that the two armatures are in series, the circuit being from line P, armature X, by brush 2, contact $a$, and their respective lines to brush 3 and contact $b$ of machine Y, thence through armature of Y to brush 4 and negative conductor N. In diagram C the circuit is from conductor P to brush 1 and contact $a$, where the circuit divides, one going through armature X to contact $b$ and brush 4, the other branch going by contact $a$ to brush 3 and through Y to brush 4 and negative line N, the machines being in multiple.

If the machine is used for generation of electro-motive force, the potential may be varied by means of the moving contacts $a$ and $b$ from the potential given by one generator to that given by two in series. If the machine to be regulated is a motor, its counter electro-motive force will be varied in the same manner, and, supposing its field-magnetism to remain constant, its speed will be increased from the degree attained by two motors in series to a degree attained by the two motors in multiple. This change will be gradual from one point to the other, and as many intermediate degrees will be given as there are sections or subdivisions in the source of electro-motive force represented by the number of segments on the commutator. The intermediate position is shown in diagram B, where the electro-motive force will be that given by one machine plus one-half of the other machine. This circuit will be from conductor P to brush 1, where it will divide, one path being through the left half of armature X, brush 2, and contact b, thence by the lower left quarter of armature Y to brush 4 and line N. The other path will be from brush 1 by the upper right quarter of armature X to contact a, to brush 3 by the right half of armature Y, to brush 4 and line N. The two quarters of the respective armatures which do not add to the electro-motive force of the machine will not short-circuit upon each other, but will add their effects in multiple to the other parts of the armatures. In the drawings which I use to illustrate my invention I show only diagrams, as the construction will be clearly understood therefrom by any one skilled in the art. Such devices as dynamos, motors, and contacts moving around the commutators thereof are well-known elements. Thus in a dynamo-electric machine there are many well-known devices by means of which the commutator-brush is moved around in correspondence with the condition of the main-line circuit, so as to take up the current at a point where the electro-motive force will be of the desired degree. Such a device would be used with my invention to move the contacts a and b around the respective commutators in correspondence with the condition of the current. In motors, on the other hand, the contacts a and b would be moved by the operator to regulate at will the speed of the driven mechanism.

Devices for moving the contacts are illustrated in Fig. 4, where d and d' are hand-levers located at opposite ends of a railway car, or at any other points from which it is desirable to control the motor mechanism, and e e' are two pulleys adapted to be rotated by the said levers. The cord f passes over grooves in the peripheries of the pulleys e and e' and thence over similar insulated pulleys on the motor-shafts, to which pulleys are attached the moving contacts a and b. It will be readily apparent that any movement of either of the levers d or d' will transmit a corresponding movement to the two contacts a and b and rotate them any desired degree around the commutators X and Y. In case regulation is to be accomplished automatically, the levers d or d' will be replaced by a corresponding arm O, operated by a solenoid-magnet M, included in the main circuit. The action of this solenoid will be modified by a dash-pot k, and its circuit will be controlled by a relay-magnet L, also included in the main circuit. By this well-known arrangement the electro-motive force will be adjusted in accordance with the amount of current passing through the relay L.

In the application of my invention to motors on a constant-potential circuit it will be found that no further arrangements than those thus far described will be necessary, in case the field-magnets of the motors are in a shunt to the main line, so that the field magnetism remains substantially constant. It is, however, not always convenient to use shunt-wound motors, especially where the potential reaches a comparatively high point—for example, five hundred volts, which is the ordinary potential for electric railways. It is more desirable in such cases to use series-wound motors, and it will be observed that with series-wound motors the current in the field-magnets will tend to become greater as the motors are shifted from series to multiple arc. If the load were gradually increased as the motors were thus shifted, so that the torque would be maintained in constant ratio to the load, the increase of field-magnet strength would substantially neutralize the effects gained by the alteration in the armature connections from series to multiple arc, and, as a result, the speed would not be changed. The increased current would be represented by the increased load moved, and even if the load remained constant the speed would not go up to the desired degree, because of the tendency which the increased field-magnet strength would have to neutralize the reduction in counter electro-motive force effected by the change of the armatures from series to multiple arc. Some means are therefore desirable by which the field-magnet strength shall not increase, but even be reduced, as the armatures are changed from series to multiple arc. This may be accomplished in any known manner; but I prefer the arrangement which is shown diagrammatically in Fig. 2. By this arrangement the field-magnets are provided with the ordinary series coils of coarse wire and are supplemented by a shunt around one of the motors. When the armatures are in series, this shunt would have a potential equal to that of one motor; but this would gradually be reduced by moving the contacts around the commutator until when the armatures were in multiple arc it would be entirely short-circuited. Referring to the figure, motors X Y would have the series coils x and y, respectively, but in addition would have supplementary shunt-coils s and t. In the drawings the shunt-coils are included in circuit between the brushes 2 and 4. With the contacts a and b in the position shown shunt-coils s and t would have between their terminals a potential nearly equal to that generated by the motor Y; but as the contact b is gradually moved around to the brush 4 the said coils are gradually short-circuited until in the extreme position substantially no current would pass through them. By means of this arrangement the field-magnet strength would be at a maximum when the armatures were in series and a minimum when they were in multiple arc. I may employ, if advisable, a corresponding shunt between the brushes 1 and 3, as indicated by the dotted lines. In that case the shunt-coils of one field-magnet could be energized by the line between the brushes 2 and 4 and the coils of the other field-magnet could be energized by the line between brushes 1 and 3. There are other means by which the field-magnet strength could be automatically maintained constant or actually reduced as the described changes in the armature of the machines are effected. Substantially the same arrangement which I describe with reference to a dynamo-electric machine may be employed in a source of electro-motive force, consisting of a series of battery-cells. In such a case the batteries would be divided into two groups and the groups subdivided into sections of one or more cells. A switch would be employed by which the two groups would be gradually shifted from series to multiple arc connection upon the principle hereinbefore set forth. Such an arrangement is shown in Fig. 3, where X and Y represent two groups of battery-cells in series, with contact-plates connected to successive points in each group. A switch is provided having two insulated contact-springs adapted to move oppositely over the series of contact-plates connected to the respective groups of batteries. One terminal of group X is permanently connected to positive line P and the other terminal to contact-spring F. One terminal of group Y is connected to contact-spring E and the other terminal to negative line N. In the position shown by the full lines in the drawings the two groups are in series; but they are gradually shifted until in the position shown by dotted lines they are completely in multiple arc. I intend herein to lay claim both to the method and the apparatus for carrying it into operation, as hereinbefore described.

As will be understood, I may employ any equivalent method or apparatus by means of which the electro-motive force of a generator or motor is regulated by providing two sources or dividing into two parts the original source of electro-motive force and changing the two parts from series to multiple arc connections by including in the circuit of each a variable portion of the opposite source, so that as this variable portion passes from a maximum to zero the two sources will be correspondingly changed from series to multiple arc; but What I especially claim as new, and desire to secure by Letters Patent, is—

1. The method of regulating electric generators or motors, which consists in dividing them into two sources of electro-motive force and completing the circuit of each source through a variable portion of the other source.

2. The method of regulating electric generators or motors, which consists in dividing them into two sectional sources of electro-motive force and completing the circuit of each source through a variable number of sections of the other.

3. The combination, with two electric generators or motors constituting sources of electro-motive force, of two line conductors connected, respectively, to one terminal of the respective sources, the other terminals of the sources being each provided with a shifting connection by which the circuit of each source is completed through a variable portion of the other source.

4. The combination, with two electric generators or motors constituting sources of electro-motive force divided into sections, of two line conductors connected, respectively, to one terminal of the respective sources, the other terminals of the sources being connected each to a moving contact adapted to pass over a series of plates connected to successive sections of the opposite source.

5. The combination, in a regulator for a dynamo-electric machine or motor, of two armatures or sources of electro-motive force, with their respective commutators, a permanent connection between one commutator-brush of each armature and one of the two line conductors, respectively, a moving contact on each commutator adapted to pass from the positive to the negative position, and a permanent electrical connection between each of said contacts and the other commutator-brush of the opposite armature.

6. The combination, in a regulator for an electric motor, of two armatures or sources of counter electro-motive force, with their respective commutators, means for changing the said armatures from series to multiple arc connection, consisting of a moving contact adapted to pass from the positive to negative position of each commutator and permanently connected to one commutator-brush of the opposite armature, and a field-magnet regulator for preventing substantial increase of field-magnet strength as the armatures are changed from series to multiple arc connection.

7. The combination, with two motors in series on a constant-potential circuit, of a field-magnet coil shunting the armatures of one of the two motors.

8. The combination, with two motor-armatures on a constant-potential circuit, of means for changing the said armatures from series to multiple arc connection, and a field-magnet coil shunting one of the said armatures.

9. The combination, with two motors on a constant-potential circuit, of means for changing their armatures from series to multiple arc connection, a series field-magnet coil for each motor, and a supplementary field-magnet coil for each motor shunting the armature of one of the two motors.

10. The combination, with two motor-armatures on a constant-potential circuit, of means for changing them from series to multiple arc connection, a series field-magnet coil for each of said armatures, and a supplementary variable coil dependent upon the armature connections, whereby the field-magnet strength of the motors is not increased as the motors are changed from series to multiple arc connection.

11. The combination, in an electro-motive-force regulator, of two armatures and suitable field-magnet coils therefor, movable commutator-contacts for each armature, by means of which the armatures may be changed from series to multiple arc connection, and a common operating device for said contacts, whereby they may be moved simultaneously and equally.

In witness whereof I have hereto set my hand this 18th day of October, 1890.

EDWARD M. BENTLEY.

Witnesses:
GEO. P. BLODGETT,
ARTHUR P. KNIGHT.